(No Model.)

L. D. CASTLE.
MACHINE FOR TAPPING STEAM, GAS, AND WATER FITTINGS.

No. 280,575. Patented July 3, 1883.

Witnesses:
J. N. Shumway
Jos. P. Earle

Lewis D. Castle
Inventor
By Atty.

N. PETERS, Photo-Lithographer, Washington, D. C.

UNITED STATES PATENT OFFICE.

LEWIS D. CASTLE, OF WATERBURY, CONNECTICUT, ASSIGNOR TO THE A. BURRITT HARDWARE COMPANY, OF SAME PLACE.

MACHINE FOR TAPPING STEAM, GAS, AND WATER FITTINGS.

SPECIFICATION forming part of Letters Patent No. 280,575, dated July 3, 1883.

Application filed May 1, 1882. (No model.)

*To all whom it may concern:*

Be it known that I, LEWIS D. CASTLE, of Waterbury, in the county of New Haven and State of Connecticut, have invented a new Improvement in Machines for Tapping Steam, Gas, and Water Fittings; and I do hereby declare the following, when taken in connection with the accompanying drawings and the letters of reference marked thereon, to be a full, clear, and exact description of the same, and which said drawings constitute part of this specification, and represent, in—

Figure 1:
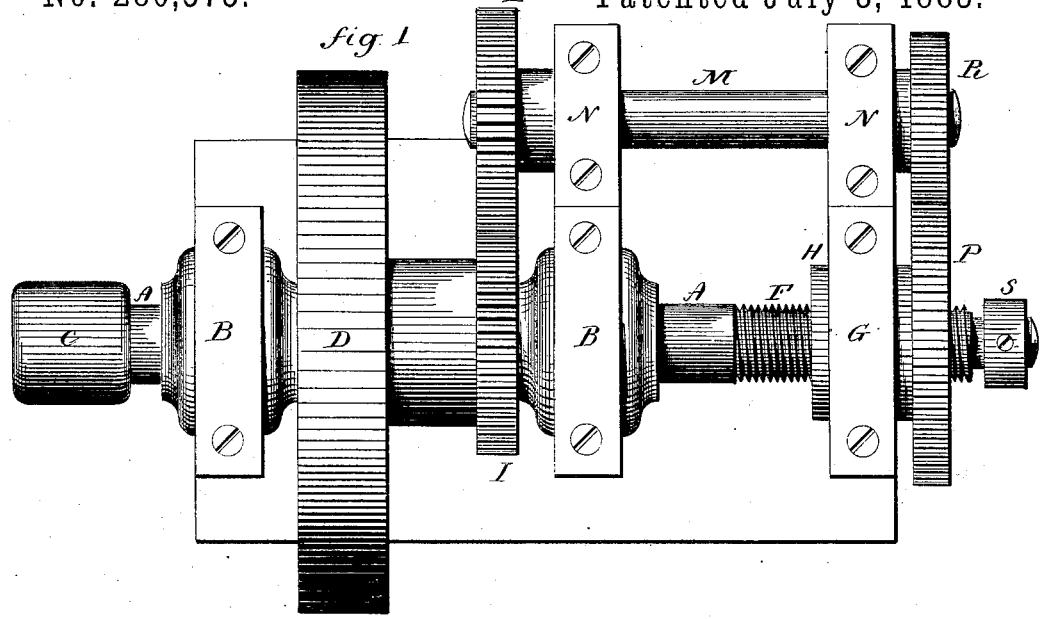
Figure 2:
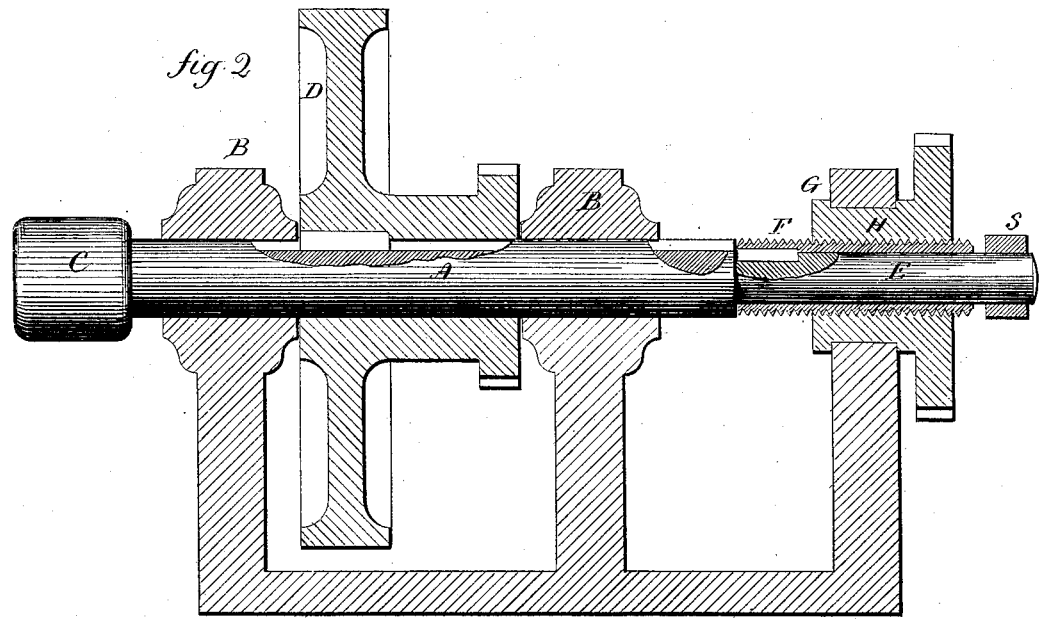

Figure 1, a top or plan view; Fig. 2, a longitudinal section.

This invention relates to an improvement in machines for tapping steam, gas, and water fittings, the object being to employ a leading-screw of a coarse pitch, and provide a feeding mechanism in connection therewith, whereby this single coarse-threaded leading-screw may serve for the various threads required to be cut; and it consists, principally, in a leading-screw attached to and capable of longitudinal motion on the spindle which carries the tap, and a nut fixed as to longitudinal movement, through which said leading-screw passes, and differential gearing between said spindle and said nut, whereby a feed or longitudinal movement is imparted to said spindle in proportion to said differential movement, as more fully hereinafter described.

In the illustrations I show only the mechanism for operating the tap. The devices for holding the article to be tapped are such as are in general use and require no description.

A is the spindle, arranged in bearings B B, so as to revolve freely therein, and also to permit free longitudinal movement. It is provided at the outer end with a chuck, C, or other device to hold the tap. Around the spindle, between the two bearings B B, is a gear or pulley, D, splined to the spindle, as seen in Fig. 2, and to which power is applied to revolve the spindle. The pulley or gear D, being held between the two bearings so as to prevent its longitudinal movement by means of the spline, imparts its revolution to the spindle, and at the same time permits the spindle to be moved longitudinally through it. At the rear end the spindle A is reduced, as at E, and over this reduced portion a screw-threaded sleeve, F, is placed, splined to the spindle, so that the sleeve revolves with the spindle, but is also capable of a certain longitudinal movement independent of said spindle.

In a bearing, G, a nut, H, is arranged so as to revolve freely in the bearing, but without axial or longitudinal movement. This nut is threaded corresponding to the sleeve F, and as seen in Fig. 2. On the hub of the driving-gear D is a pinion, I, which works into a corresponding pinion, L, on a counter-shaft, M, arranged in bearings N parallel with the spindle, and so that the revolution of the spindle will be communicated to the counter-shaft. On the nut H is a gear, P, into which a pinion, R, on the driving-shaft M works to revolve the nut. It will be apparent that if the gears be equal the revolution of the nut H would be the same as the revolution of the spindle; but if the gears be differential, as shown—that is, so as to turn the nut at a less velocity than the spindle, then the spindle will be advanced to the extent of that difference, and this difference in the two velocities corresponds to the pitch of the thread to be cut, and may be varied by changing the gears R P, or the introduction of intermediate gears, which will give to the nut H the required revolution slower than the revolution of the spindle—that is to say, for illustration, if the nut be held stationary, then the advance of the spindle would correspond to the thread of the leading-screw or sleeve F, and in proportion as the nut is turned from the stationary condition up to the same velocity as the spindle the advance of the spindle will be reduced. The advance of the spindle must correspond to the thread to be cut, in order that the tap may properly engage in the hole to be tapped, so as to properly start the cutting of the thread. If the leading-screw, instead of being on a sleeve longitudinally loose on the spindle, were rigid thereon, the same result would be accomplished—that is, the same longitudinal advance movement would be imparted to the spindle; but in making the leading-screw directly on the spindle, or rigidly attached to it, a difficulty occurs in the reversing of the spindle to withdraw the tap, owing to "backlash" unavoidable between the gears—that is to say, if the leading-screw be rigid on the spindle the action of the nut and of the tap must be simultaneous or the thread would be stripped. This simultaneous reversing of the two cannot be accomplished, because of the unavoidable backlash in the gearing between the nut and spindle. To overcome this difficulty I permit a certain amount of longitudinal play to the leading-screw sleeve F, by arranging a collar, S, on the spindle at the rear, and so as to permit the sleeve to run a certain distance on the return before it will strike the collar. The distance of the collar S from the end of the sleeve when forward must be sufficient to counteract the backlash. On reversing the revolution of the spindle it will of course automatically run rearward, because of the thread which it has cut in the thing to be tapped, and until it has passed out from the tap-hole. Then the screw-sleeve will complete the retreat of the spindle; and when the next operation is to be performed the screw-sleeve will move longitudinally until it comes to its forward bearing on the spindle, then will move off the spindle to carry the die into cutting engagement with the hole to be tapped.

I am aware of Patent No. 193,168, and claim nothing therein shown and described, the essential feature of my invention being the screw-threaded sleeve on the spindle splined thereto, so as to revolve with the spindle, but free for a certain amount of longitudinal movement independent of the spindle, whereby the backlash hereinbefore referred to is overcome, and as in the combination hereinafter recited.

I claim—

1. In a tapping-machine, substantially such as described, the combination of the spindle which carries the tap, mechanism for imparting revolution thereto, a screw-threaded sleeve arranged on the spindle to revolve with it, but loose longitudinally thereon, a nut on said screw-threaded sleeve, arranged in a bearing for rotation independent of the spindle, but fixed as to longitudinal movement, with gearing intermediate between the spindle and said nut, whereby a differential revolution is imparted to said nut, substantially as described.

2. The combination of the spindle A, mechanism, substantially such as described, for imparting rotation to said spindle, the screw-threaded sleeve F on said spindle and splined thereto, so as to revolve with the spindle, but free for independent longitudinal movement, the nut H on said sleeve and in a bearing free for rotation, but fixed as to longitudinal movement, intermediate gearing between the spindle and nut to impart differential revolution to said nut, the collar S on the spindle in rear of said sleeve, to limit longitudinal movement of the sleeve independent of the spindle, substantially as described.

LEWIS D. CASTLE.

Witnesses:
ALBERT M. BURRITT,
EUGENE J. DAVIS.